United States Patent
Kunimoto

(10) Patent No.: US 10,771,650 B2
(45) Date of Patent: Sep. 8, 2020

(54) INFORMATION PROCESSING DEVICE TO EXECUTE PREDETERMINED IMAGE PROCESS ASSOCIATED WITH A CALCULATED PREDETERMINED MOVING DIRECTION WHEN DISPLAYED OBJECT IS SWIPED

(71) Applicant: BROTHER KOGYO KABUSHIKI KAISHA, Nagoya-shi, Aichi (JP)

(72) Inventor: Shintaro Kunimoto, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 15/581,316

(22) Filed: Apr. 28, 2017

(65) Prior Publication Data
US 2017/0318177 A1 Nov. 2, 2017

(30) Foreign Application Priority Data
Apr. 28, 2016 (JP) ................ 2016-090827

(51) Int. Cl.
*G06F 3/0488* (2013.01)
*H04N 1/00* (2006.01)
(Continued)

(52) U.S. Cl.
CPC ......... *H04N 1/00973* (2013.01); *G06F 3/041* (2013.01); *G06F 3/0488* (2013.01);
(Continued)

(58) Field of Classification Search
None
See application file for complete search history.

(56) References Cited

U.S. PATENT DOCUMENTS

2002/0134829 A1* 9/2002 Tanaka ................ B41J 2/17546
235/375
2010/0054764 A1 3/2010 Nishikawa
(Continued)

FOREIGN PATENT DOCUMENTS

JP 2009-010511 A 1/2009
JP 2010-052250 A 3/2010
(Continued)

OTHER PUBLICATIONS

Yuki Tanaike, et al., "Realization of customizable gesture interfaces in mobile devices", The Transactions of Human Interface Society, May 25, 2013, vol. 15, No. 2.
(Continued)

*Primary Examiner* — Benny Q Tieu
*Assistant Examiner* — Haris Sabah
(74) *Attorney, Agent, or Firm* — Scully, Scott, Murphy & Presser, PC

(57) ABSTRACT

A information processing device may store a first and second image process associated with a first and second moving direction. The information processing device may display an object image on a display. The information processing device may detect a first instruction position when an indicator makes contact with the object image. The information processing device may detect a second instruction position when the indicator moves to the second instruction position, while maintaining a state of being in contact with the display. The information processing device may calculate a predetermined direction towards which the second instruction position is located. The information processing device may execute a first image process on the object image when the calculated predetermined direction corresponds to the first moving direction. The information processing device may execute a second image process on the object (Continued)

image when the calculated predetermined direction corresponds to the second moving direction.

12 Claims, 13 Drawing Sheets

(51) Int. Cl.
| | |
|---|---|
| *G06F 3/0484* | (2013.01) |
| *G06F 3/041* | (2006.01) |
| *H04N 1/333* | (2006.01) |
| *G06K 9/03* | (2006.01) |
| *G06F 3/0482* | (2013.01) |
| *H04W 84/12* | (2009.01) |

(52) U.S. Cl.
CPC ...... *G06F 3/04845* (2013.01); *G06F 3/04847* (2013.01); *G06F 3/04883* (2013.01); *H04N 1/00106* (2013.01); *H04N 1/00307* (2013.01); *H04N 1/00458* (2013.01); *H04N 1/00461* (2013.01); *H04N 1/00474* (2013.01); *H04N 1/00482* (2013.01); *G06F 3/0482* (2013.01); *G06F 2203/04105* (2013.01); *G06F 2203/04108* (2013.01); *G06K 9/036* (2013.01); *H04N 1/33369* (2013.01); *H04N 2201/0055* (2013.01); *H04N 2201/0075* (2013.01); *H04N 2201/0094* (2013.01); *H04N 2201/0098* (2013.01); *H04W 84/12* (2013.01)

(56) References Cited

U.S. PATENT DOCUMENTS

| | | | |
|---|---|---|---|
| 2011/0145767 | A1 | 6/2011 | Satou et al. |
| 2012/0092707 | A1* | 4/2012 | Saito ............... G06F 3/1208 358/1.15 |
| 2012/0250071 | A1* | 10/2012 | Miller ............... G06F 3/1205 358/1.15 |
| 2013/0031516 | A1* | 1/2013 | Sawayanagi ....... H04N 1/00411 715/863 |
| 2013/0182168 | A1 | 7/2013 | Otani |
| 2014/0155121 | A1 | 6/2014 | Haba |
| 2016/0291771 | A1* | 10/2016 | Wells ............... G06F 3/0488 |
| 2016/0313900 | A1* | 10/2016 | Awano ............. G06K 15/002 |

FOREIGN PATENT DOCUMENTS

| | | |
|---|---|---|
| JP | 2010-271981 A | 12/2010 |
| JP | 2011-12877 A | 6/2011 |
| JP | 2011-107823 A | 6/2011 |
| JP | 2012-177998 A | 9/2012 |
| JP | 2013-146011 A | 7/2013 |
| JP | 2014-110520 A | 6/2014 |
| JP | 2014-137728 A | 7/2014 |

OTHER PUBLICATIONS

Tsutsumu Ishikawa, "Tsuini Tenji + Yoyaku Kaishi!! Hatsubaibi wa 24nichi Apple Watch Shiyou Review", Weekly ASCII, Kadokawa Corporation, Apr. 14, 2015, vol. 1025, pp. 14-15.
Japanese Office Action dated Jan. 28, 2020 from related JP 2016-090827 together with English language translation.

* cited by examiner

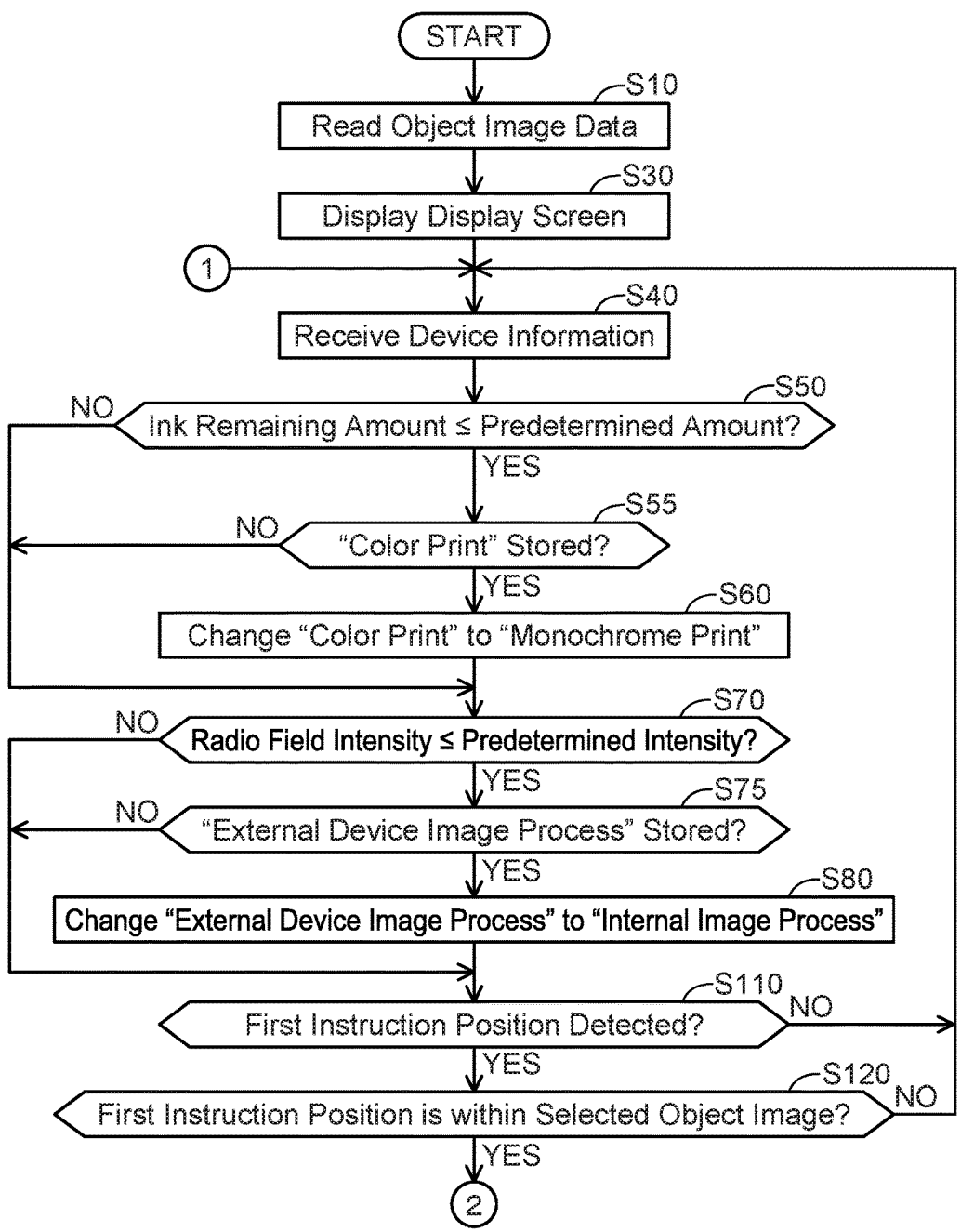

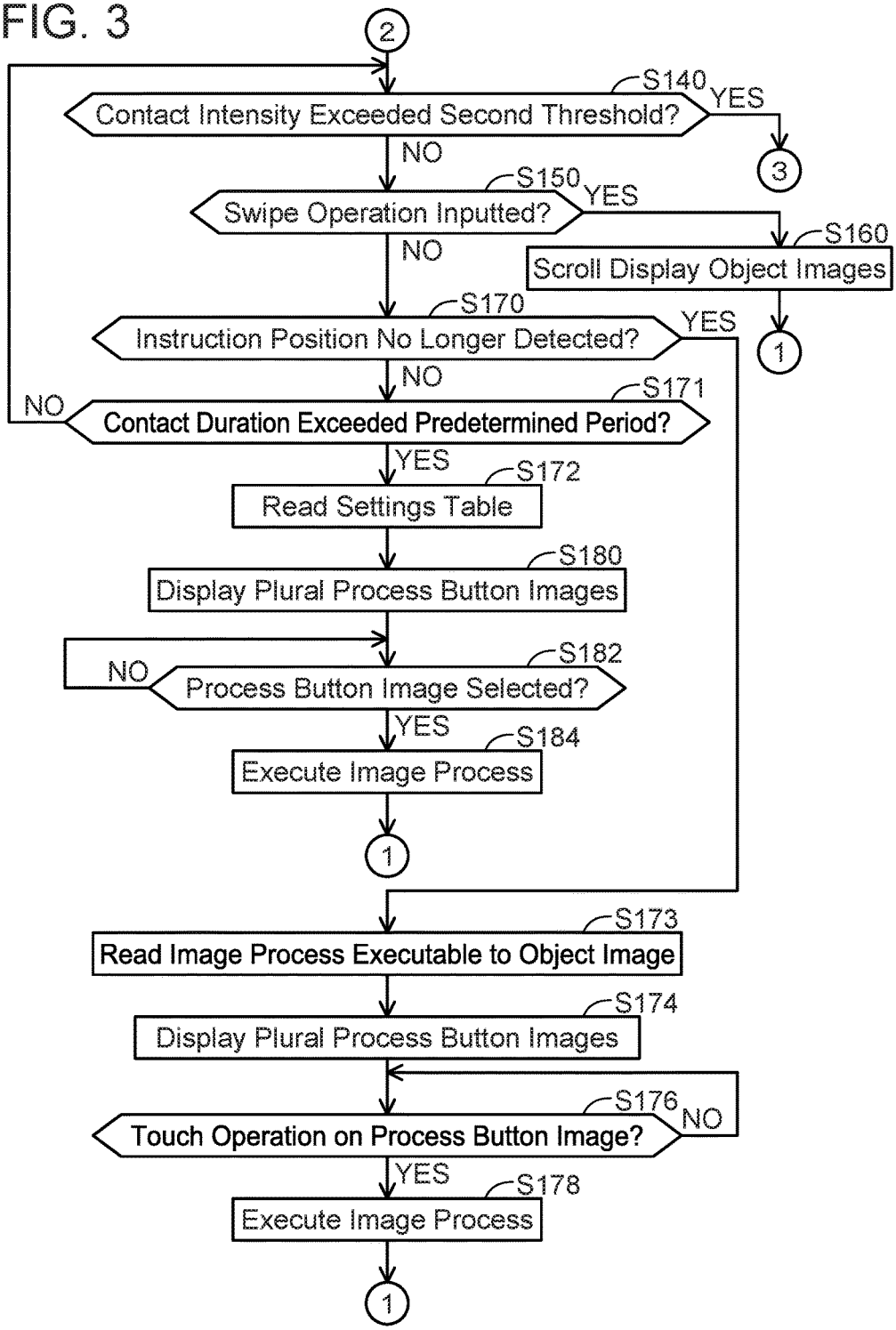

FIG. 6

| Image Process Type | First Image Processing Type Category | Second Image Processing Type Category |
|---|---|---|
| Color print | External Device Image Process | First Type |
| Monochrome print | External Device Image Process | First Type |
| Send FAX | External Device Image Process | First Type |
| Preview | Internal Image Process | Second Type |
| Edit Image | Internal Image Process | Second Type |
| Display file information | Internal Image Process | Second Type |
| Send email | Internal Image Process | Second Type |
| Upload to SNS | Internal Image Process | Second Type |
| Delete | Internal Image Process | First Type |

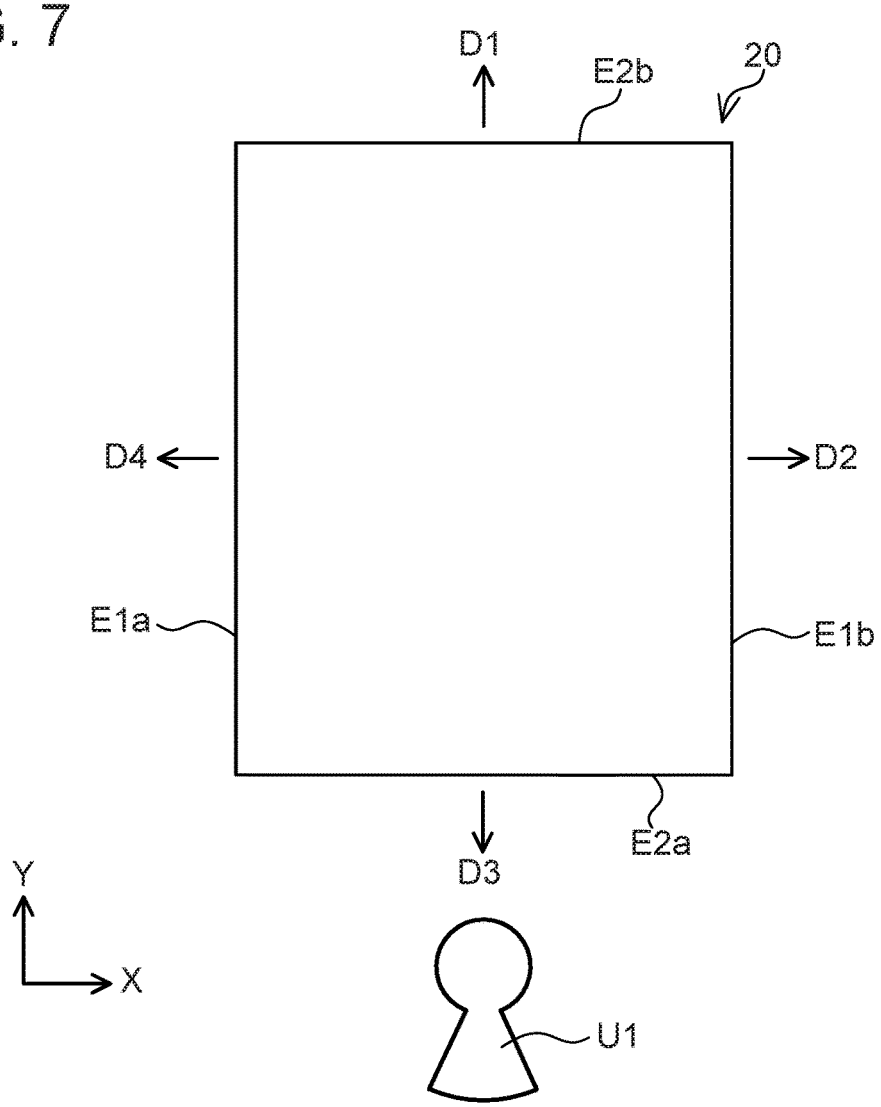

FIG. 8

| Types of Object Image Data | | | |
|---|---|---|---|
| | Photo | PDF | Data for Word Processing Software |
| Moving Direction (D1) | Color Print — R1 | Send FAX | Monochrome Print — R4 |
| Moving Direction (D2) | Send FAX | Monochrome Print | Color Print — R8 |
| Moving Direction (D3) | Edit Image — R2 | Color Print | Display File Information — R7 |
| Moving Direction (D4) | Preview — R5 | Preview — R9 | Edit Image |

| | Types of Object Image Data | | | |
|---|---|---|---|---|
| | Photo | PDF | | Data for Word Processing Software |
| Moving Direction (D1) | Color Print, Send FAX | Send FAX | Monochrome Print | Monochrome Print |
| Moving Direction (D2) | Send FAX | Monochrome Print | | Color Print |
| Moving Direction (D3) | Edit Image | Color Print | | Display File Information |
| Moving Direction (D4) | Preview | Preview | | Edit Image |

TB2a

R21

INFORMATION PROCESSING DEVICE TO EXECUTE PREDETERMINED IMAGE PROCESS ASSOCIATED WITH A CALCULATED PREDETERMINED MOVING DIRECTION WHEN DISPLAYED OBJECT IS SWIPED

TECHNICAL FIELD

The present application relates to a program and an information processing device configured to display an image on a display.

BACKGROUND

In a device capable of performing a plurality of image processes on image data, there is a known technique for receiving user's selection regarding which image process is to be performed. For example, there is a known technique that displays a plurality of image processes related to a displayed item when the displayed item indicating the image data is tapped. A user can select a desired image process from among the displayed image processes to perform the selected image process on the image data.

SUMMARY

An information processing device capable of promptly receiving an image process selection by a user is in demand. In this description, a technique that enables prompt selection input of an image process will be provided.

One technique disclosed in the present application is a non-transitory computer-readable recording medium storing computer-readable instructions for an information processing device. The information processing device may comprise a display; a position detector; and a memory. The computer-readable instructions, when executed by a controller of the information processing device, may cause the information processing device to perform storing a first image process, which is selected from among plural types of image processes, in the memory by associating the first image process with a first moving direction. The first moving direction may be a direction having a display frame of the display as a reference. The computer-readable instructions may cause the information processing device to perform storing a second image process, which is selected from among plural types of image processes, in the memory by associating the second image process with a second moving direction, which is different from the first moving direction. The second moving direction may be a direction having the display frame of the display as the reference. The computer-readable instructions may cause the information processing device to perform displaying an object image on the display. The computer-readable instructions may cause the information processing device to perform detecting a first instruction position by using the position detector in a case where an indicator makes contact with or approaches a displayed region of the object image. The first instruction position may indicate a position where the indicator has made contact or approached. The computer-readable instructions may cause the information processing device to perform detecting a second instruction position by using the position detector, in a case where the indicator moves to the second instruction position, after the first instruction position had been detected, while maintaining a state of being in contact with or being in proximity of a surface of the display. The computer-readable instructions may cause the information processing device to perform calculating a predetermined direction, which is a direction towards which the second instruction position is located with the first instruction position as a reference. The computer-readable instructions may cause the information processing device to perform executing the first image process, which is associated with the first moving direction, on image data representing the object image in a case where the calculated predetermined direction corresponds to the first moving direction. The computer-readable instructions may cause the information processing device to perform executing the second image process, which is associated with the second moving direction, on the image data representing the object image in a case where the calculated predetermined direction corresponds to the second moving direction.

BRIEF DESCRIPTION OF DRAWINGS

FIG. 2 is a diagram showing an operational flow chart of the information processing device;

FIG. 3 is a diagram showing an operational flow chart of the information processing device;

FIG. 6 is a diagram showing an example of an image processing table;

FIG. 7 is a diagram showing an example of a moving direction;

FIG. 8 is a diagram showing an example of a settings table;

FIG. 13 is a diagram showing an example of a settings table; and

DETAILED DESCRIPTION

Figure 1:
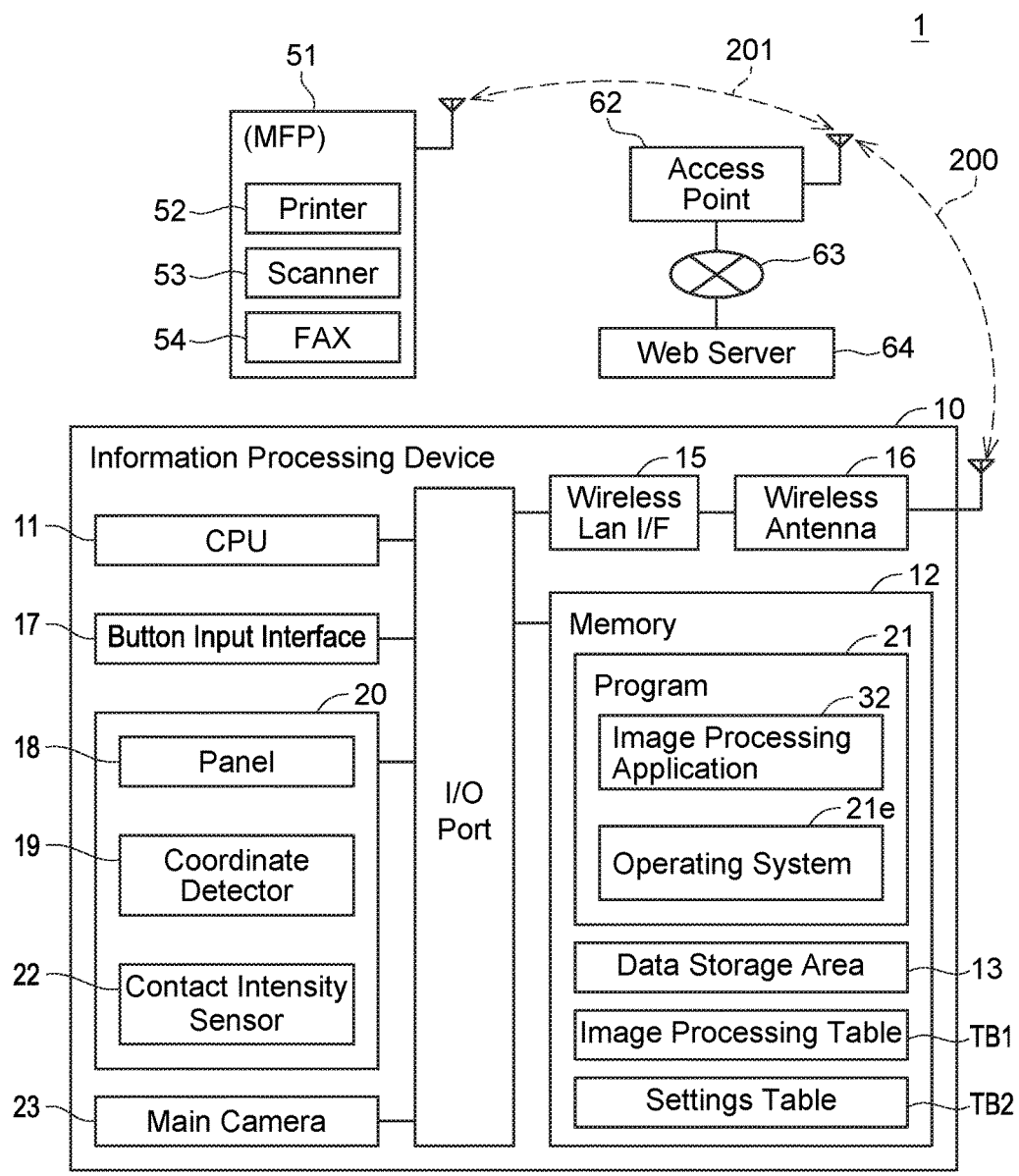
FIG. 1 is a block diagram of an information processing device.
Figure 4A:
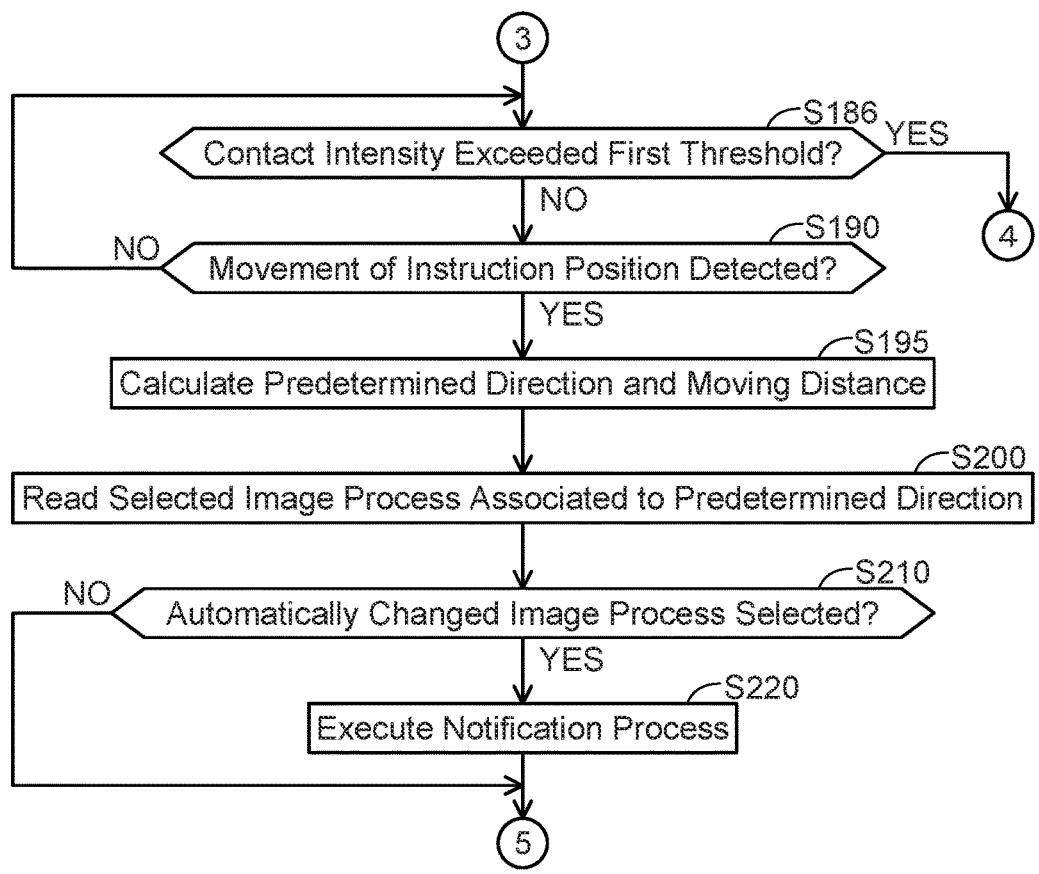
FIG. 4A is a diagram showing an operational flow chart of the information processing device.
Figure 4B:
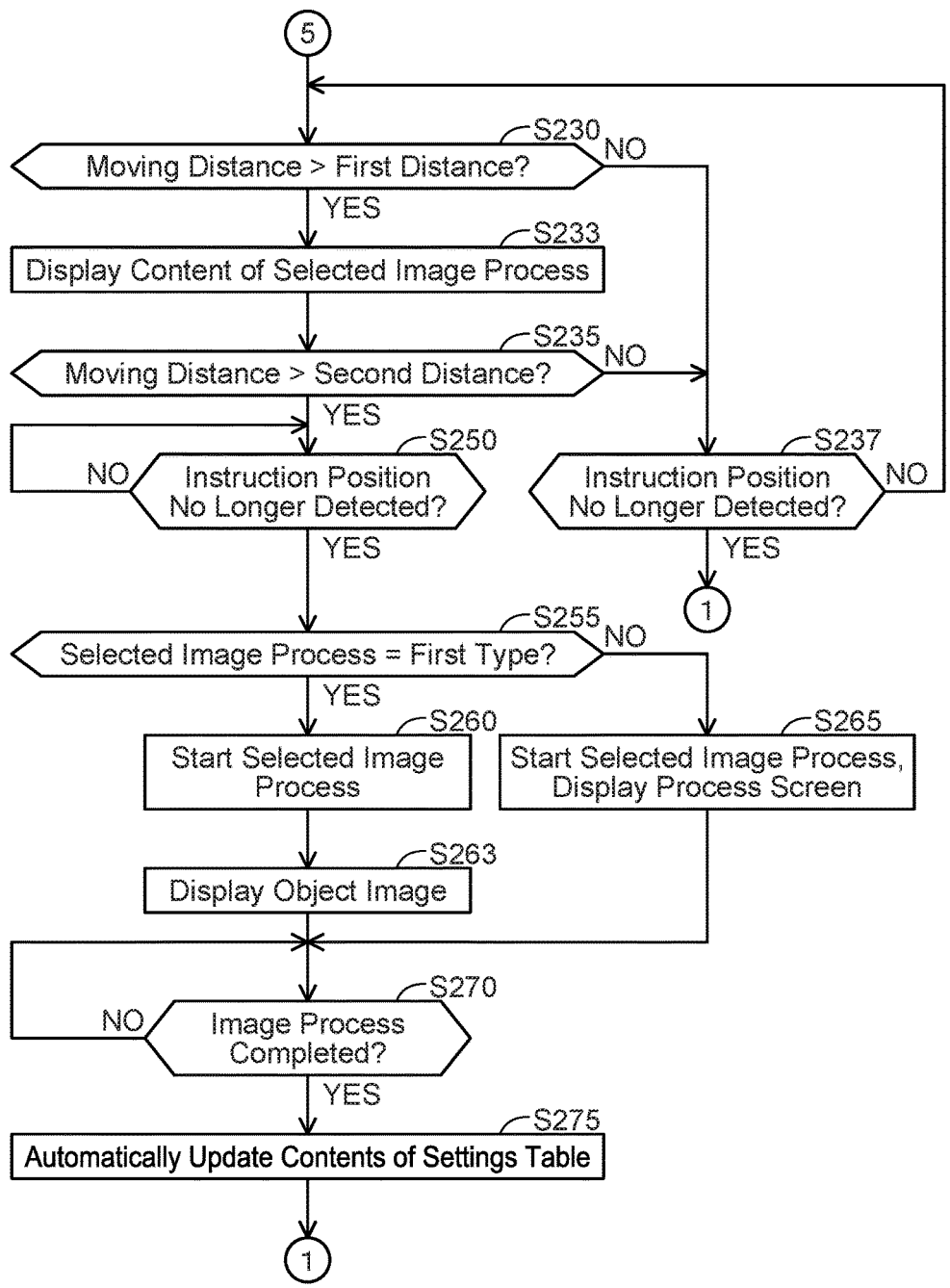
FIG. 4B is a diagram showing an operational flow chart of the information processing device.
Figure 5:
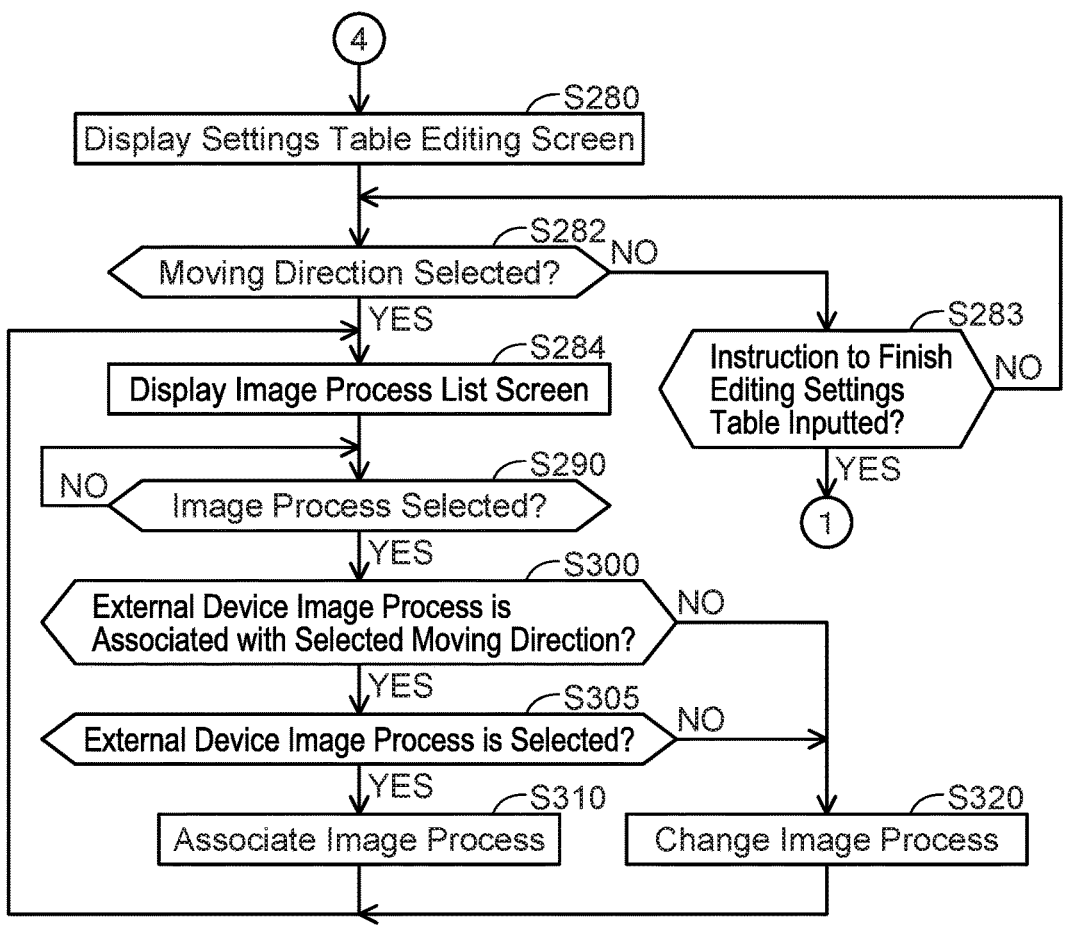
FIG. 5 is a diagram showing an operational flow chart of the information processing device.

FIG. 1 shows a block diagram of a communication system 1 exemplified as the present embodiment. The communication system 1 is provided with an information processing device 10, a MFP 51, an access point 62, the Internet 63, and a web server 64.

The MFP 51 is a multi-function peripheral including a printer 52, a scanner 53, a FAX 54, and the like. The printer 52 is configured to print a print image on a recording sheet. The scanner 53 scans a document to generate scan data. The FAX 54 sends FAX data to an external destination through a telecommunication line that is not shown.

The access point 62 is a known relay device. The information processing device 10 and the access point 62 are configured capable of performing a wireless communication 200 using an infrastructure-mode wireless LAN connection scheme. Further, the MFP 51 and the access point 62 are configured capable of performing a wireless communication 201 using an infrastructure-mode wireless LAN connection scheme. Notably, examples of the schemes for the wireless communications 200 and 201 include communication schemes defined by the IEEE802.11a/b/g standard, for example. Further, the access point 62 is connected to the web server 64 via the Internet 63.

The information processing device 10 primarily includes a CPU 11, a memory 12, a wireless LAN interface 15, a wireless antenna 16, a button input interface 17, a panel 18, a coordinate detector 19, a contact intensity sensor 22, and a main camera 23. A smartphone, a tablet terminal, a cell phone, and a PC are examples of the information processing device 10.

The button input interface 17 is configured to receive operations by a user of the information processing device 10. A keyboard is an example of the button input interface 17. The panel 18 is configured to display various types of function information of the information processing device 10. The coordinate detector 19 is a section configured to detect an instructed coordinate, which is a coordinate indicating a position where an indicator (e.g., user's fingertip) had contacted within a display region of the panel 18, and to output the same. The coordinate detector 19 is integrated with the panel 18 to function as a touch panel 20. The coordinate detector 19 is configured capable of simultaneously detecting plural instructed coordinates. The contact intensity sensor 22 is a sensor used to measure a contact force (or pressure) applied on the touch panel 20. The contact intensity sensor 22 outputs a first value when the contact intensity is smaller than a second threshold. Further, the contact intensity sensor 22 outputs a second value when the contact intensity is larger than the second threshold but smaller than a first threshold. When the contact intensity is larger than the first threshold, the contact intensity sensor 22 outputs a third value. The contact intensity sensor 22 is arranged integrally to the touch panel 20, or in a vicinity thereof. The main camera 23 is a camera installed in the information processing device 10. The wireless LAN interface 15 performs wireless communications that are according to cell phone communication schemes or wireless LAN schemes using the wireless antenna 16.

The CPU 11 executes processes according to a program 21 in the memory 12. Hereafter, the CPU 11 that executes programs, such as the image processing application 32 or the operating system 21e, may simply be referred to by the program name. For example, the description "the operating system 21e performs . . . " may mean that "the CPU 11 executing the operating system 21e performs . . . ".

The memory 12 is configured by a RAM, a ROM, a flash memory, a HDD, a buffer provided in the CPU 11, and the like being combined. The memory 12 stores the program 21. The program 21 includes the operating system 21e and the image processing application 32. The operating system 21e is a program that provides functions to cause various images to be displayed on the panel 18, and basic functions utilized by the image processing application 32. Further, the operating system 21e is a program that provides the API for enabling respective applications to give instructions to various types of hardware. The image processing application 32 can be utilized by being installed in the information processing device 10 by the user or the like.

The memory 12 includes a data storage area 13. The data storage area 13 stores a plurality of object image data. The object image data has plural types. For example, photo data, PDF data, data for word processing software, data for sheet calculation software, and data for presentation software may be exemplified.

Further, the memory 12 stores an image processing table TB1 and a settings table TB2. FIG. 6 shows an example of the image processing table TB1. The image processing table TB1 stores plural types of image processes. These plural types of image processes are processes that can be executed on a selected object image selected by the user. "Color print" is a process for causing the MFP 51 to perform color print. "Monochrome print" is a process for causing the MFP 51 to perform monochrome print. "Send FAX" is a process for causing the MFP 51 to send FAX data. In the processes of "color print", "monochrome print", and "send FAX", data of the selected object image is sent to the MFP 51 via the wireless communications 200 and 201. "Preview" is a process to display a print preview of the selected object image on the touch panel 20. "Edit image" is a process to execute various editing processes, such as trimming and rotation, on the selected object image. "Display file information" is a process to display file information of the image data that represents the selected object image (such as a file name, created date, data size, etc.) on the touch panel 20. "Send by email" is a process to attach the image data that represents the selected object image to an email and send the same. "Upload to SNS" is a process to send the image data that represents the selected object image to the web server 64 via the wireless communication 200. "Delete" is a process to delete the image data that represents the selected object image from the data storage area 13.

The plural types of image processes can be categorized into a first image processing type category 71 and a second image processing type category 72. The first image processing type category 71 includes external device image process and internal image process. The external device image process includes sending the image data to the MFP 51, which is an external device, via the wireless LAN interface 15 and the wireless antenna 16, and is a process to cause the MFP 51 execute various types of image processing. In an example of the image processing table TB1, "color print", "monochrome print", and "send FAX" correspond to the external device image process. The internal image process is a process executed internally in the information processing device 10. In the example of the image processing table TB1, "preview", "edit image", "display file information", "send by email", "upload to SNS", and "delete" correspond to the internal image process.

The second image processing type category 72 includes a first type and a second type. The first type of image process is an image process of which processing contents do not need to be displayed on the touch panel 20. Thus, other image processes can be executed in parallel while executing the first type of image process. In other words, the first type of image process is an image process that is executable as a background process. In the example of the image processing table TB1, "color print", "monochrome print", "send FAX", and "delete" correspond to the first type of image process. The second type of image process is an image process of which processing contents need to be displayed on the touch panel 20. Thus, other image processes cannot be executed in parallel during a period in which the second type of image process is being executed. In other words, the second type of image process is an image process that cannot be executed as a background process. In the example of the image processing table TB1, "preview", "edit image", "display file information", "send by email", and "upload to SNS" correspond to the second type of image process.

FIG. 8 shows an example of the settings table TB2. The settings table TB2 is a table for storing image processes in association to respective ones of moving directions D1 to D4. The moving directions D1 to D4 will be described with reference to FIG. 7. The touch panel 20 has a rectangular shape, and is provided with sides E1a, E1b, E2a, E2b. As shown in FIG. 7, a case will be described in which the side E2a of the touch panel 20 faces a user U1. In this case, the sides E1a and E1b extend in a Y-axis direction. The Y-axis direction is a direction that separates away from the user. Further, sides E2a and E2b extend in an X-axis direction that orthogonally intersects the Y-axis direction. The X-axis direction is a left and right direction as seen from the user. The moving direction D1 is a direction that separates away from the user U1 along the Y-axis direction. The moving direction D2 is the rightward direction as seen from the user U1 along the X-axis direction. The moving direction D3 is a direction that approaches the user U1 along the Y-axis direction. The moving direction D4 is the leftward direction as seen from the user U1 along the X-axis direction.

The various image processes stored in the settings table TB2 of FIG. 8 are processes selected from among the image processes included in the image processing table TB1. In the settings table TB2, different image process may be associated to each of the types of the object image data, such as "photo", "PDF", "data for word processing software", and the like. For example, "color print" is associated to the moving direction D1 of the "photo" object image data. However, "send FAX" is associated to the moving direction D1 of the "PDF" object image data.

<Operation of Information Processing Device>

An operation of the information processing device 10 of the embodiment will be described with reference to a flowchart of FIG. 2. When the user inputs an operation to activate the image processing application 32 using the touch panel 20, the CPU 11 reads the image processing application 32 to start an overall control of the information processing device 10. The flow of FIG. 2 is thereby started.

In S10, the CPU 11 reads a plurality of object image data from the data storage area 13.

Figure 9:
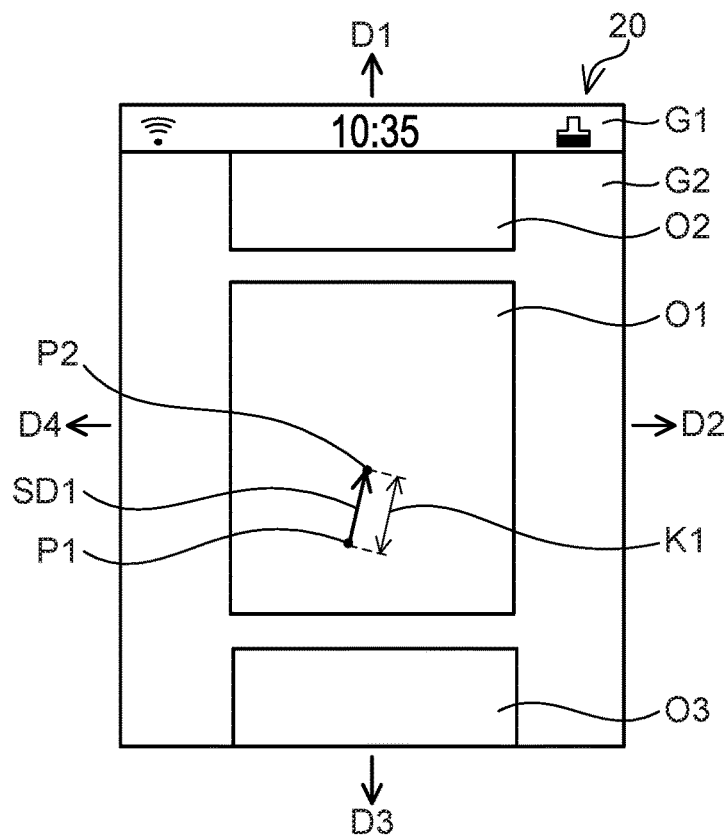
FIG. 9 is a diagram showing an example of a display screen.

In S30, the CPU 11 displays a display screen on the touch panel 20. FIG. 9 shows an example of the display screen. The display screen includes a display regions G1 and G2. The display region G1 is a region where various statuses such as remaining battery are displayed. The display region G2 is a region where various images are displayed by the image processing application 32. In the example of FIG. 9, the display region G2 displays a selected object image O1 and object images O2 and O3. The selected object image O1 and the object images O2, O3 are images that are displayed by the object image data read out in S10. The selected object image O1 is an image selected as a process target of the various image processes. In the configuration displayed in FIG. 9, the selected object image O1 is indicated as having been selected by displaying the selected object image O1 at a center of the display region G2. The object images O2 and O3 are images that are not selected as the process target of the various image processes. In the configuration displayed in FIG. 9, the object images O2 and O3 are indicated as not being selected by displaying only parts of the object images O2 and O3 at edges of the display region G2.

In S40, the CPU 11 receives device information from the MFP 51 via the wireless communications 200 and 201. The device information includes information indicating remaining amounts of consumable components (such as ink and printing sheets) of the printer 52 provided in the MFP 51.

In S50, the CPU 11 determines whether or not an ink remaining amount of the printer 52 is equal to or less than a predetermined amount. Specifically, in a case where the printer 52 is provided with ink for C, M, Y, and K, a determination is made herein as to whether the ink remaining amount of any of C, M, and Y is equal to or less than a predetermined amount. When a negative determination is made (S50: NO), that is, when an ink remaining amount for K is equal to or less than a predetermined amount, or when the ink for all of C, M, Y, and K exceeds the predetermined amount, the CPU 11 proceeds to S70, and when an affirmative determination is made, that is, when the ink remaining amount of any of C, M, and Y is equal to or less than the predetermined amount (S50: YES), the CPU 11 proceeds to S55. In S55, the CPU 11 determines whether or not "color print" is stored in the settings table TB2. When a negative determination is made (S55: NO) the CPU 11 proceeds to S70, and when an affirmative determination is made (S55: YES) the CPU 11 proceeds to S60. In S60, the CPU 11 changes "color print" in the settings table TB2 to "monochrome print".

In the explanatory example of the embodiment, the image process for "color print" is associated to regions R1, R8, and R9 in the settings table TB2 shown in FIG. 8. The image process for "color print" in these regions is changed to the image process for "monochrome print".

In S70, the CPU 11 determines whether or not a radio field intensity of the wireless communication 200 is equal to or less than a predetermined intensity. This determination can be executed based on information indicating the radio field intensity which the wireless antenna 16 outputs. When a negative determination is made (S70: NO), the CPU 11 proceeds to S110, and when an affirmative determination is made (S70: YES), the CPU 11 proceeds to S75. In S75, the CPU 11 determines whether or not any of the image processes stored in the settings table TB2 is stored in association to "external device image process" in the image processing table TB1. This determination can be executed by referring to the first image processing type category 71 in the image processing table TB1 (FIG. 6). When a negative determination is made (S75: NO), the CPU 11 proceeds to S110, and when an affirmative determination is made (S75: YES), the CPU 11 proceeds to S80. In S80, the CPU 11 changes the image process to which "external device image process" is associated in the settings table TB2 to one of image processes to which "internal device image process" is associated.

In the explanatory example of the embodiment, "color print", "monochrome print", and "send FAX" in regions R1, R2, R4, R7, R8, and R9 of the settings table TB2 shown in FIG. 8 are the external device image processes. These external device image processes are changed for example to an internal image process such as "preview".

In S110, the CPU 11 determines whether or not a first instruction position P1 is detected within the display region G2. This determination can be executed based on whether or not an instructed coordinate is outputted from the coordinate detector 19. The first instruction position P1 is a position where the indicator mad made contact. User's fingertip or a stylus pen is an example of the indicator. When a negative determination is made (S110: NO), the CPU 11 returns to S40, and when an affirmative determination is made (S110: YES), the CPU 11 proceeds to S120.

In S120, the CPU 11 determines whether or not the detected first instruction position P1 is within a display region of the selected object image O1. This determination can be executed by using coordinate values of the first instruction position P1 and coordinate values of the selected object image O1. When a negative determination is made (S120: NO), the CPU 11 returns to S40, and when an affirmative determination is made (S120: YES), the CPU proceeds to S140. In the explanatory example of the embodiment, as shown in FIG. 9, a case will be explained in which the first instruction position P1 is detected within the display region of the selected object image O1. In this case, the CPU 11 proceeds to S140.

In S140, the CPU 11 determines whether or not a contact intensity of the indicator exceeds a second threshold. Specifically, a detection is executed as to whether or not a second or third value is outputted from the contact intensity sensor 22. When a negative determination is made (S140: NO), the CPU 11 proceeds to S150.

In S150, the CPU 11 determines whether or not a so-called swipe operation has been inputted. Specifically, a determination is made as to whether a movement of the instruction position is detected while maintaining both of a state in which the contact intensity is smaller than the second threshold and a state in which the indicator is in contact with the touch panel. This determination can be executed by detecting whether or not the instructed coordinate outputted from the coordinate detector 19 has changed under a state in which the first value is being outputted from the contact intensity sensor 22. When an affirmative determination is made (S150: YES), the CPU 11 proceeds to S160.

In S160, the CPU 11 scroll displays the object images according to the inputted swipe operation. Then, it returns to S40. For example in FIG. 9, when a swipe operation of moving the indicator downward in the touch panel 20 while keeping the indicator in contact with the selected object image O1 is inputted, both the object image O2 and the selected object image O1 move downward. Due to this, the object image O2 is displayed at the center of the display region G2. Further, only an upper portion of the selected object image O1 is displayed at a lower side of the display region G2. Due to this, the object image O2 can be selected as the process target for the image processes.

On the other hand, in S150, the CPU 11 proceeds to S170 when a negative determination is made (S150: NO). In S170, the CPU 11 determines whether or not the instruction position is no longer detected. When a negative determination is made (S170: NO), the process proceeds to S171. In S171, the CPU 11 determined whether or not a contact duration in which the indicator is in contact with the touch panel exceeded a preset predetermined period. When a negative determination is made (S171: NO), the CPU returns to S140. On the other hand, when an affirmative determination is made (S171: YES), it is determined as that a long-pressing operation has been inputted, and the CPU 11 proceeds to S172. In S172, the CPU 11 refers to the settings table TB2 and reads out the image processing stored in association with the type of the selected object image O1. In the explanatory example of the embodiment, "color print", "send FAX", "edit image", and "preview" associated with the type "photo" are read.

In S180, the CPU 11 displays a quick menu screen on the touch panel 20. Specifically, plural process button images indicating the four image processes read out in S172 are displayed around the first instruction position P1. The process button images are images for accepting inputs of instructions to carry out the image processes on the selected object image O1. In S182, the CPU 11 determines whether or not any of the process button images has been selected. Specifically, it determines whether or not a tap operation has been inputted to one of the process button images. When a negative determination is made (S182: NO), the CPU 11 returns to S182, and when an affirmative determination is made (S182: YES), it proceeds to S184. In S184, the CPU 11 executes the image process associated with the selected process button image on the selected object image O1. Thereafter, the CPU 11 returns to S40.

On the other hand, in S170, when an affirmative determination is made (S170: YES), it is determined as being a case where a tap operation has been inputted relating to the selected object image O1, and the CPU 11 proceeds to S173. In S173, the CPU 11 reads all image processes that are executable for the selected object image O1 from the memory 12, based on the image processing table TB1 in FIG. 6. In S174, the CPU 11 displays a normal menu screen on the touch panel 20. Specifically, a plurality of process button images indicating the image processes read out in S173 is displayed in the display region G2. In S176, the CPU 11 determined whether or not a tap operation has been inputted relating to any one of the process button images. When a negative determination is made (S176: NO), the CPU 11 returns to S176, and when an affirmative determination is made (S176: YES), the CPU 11 proceeds to S178. In S178, the CPU 11 executes the image process associated with the process button image that had been tapped on the selected object image O1. Thereafter, the CPU 11 returns to S40.

Further, in S140, when an affirmative determination is made (S140: YES), the CPU 11 proceeds to S186. In S186, the CPU 11 determines whether or not the contact intensity exceeds a first threshold. Specifically, a detection is performed as to whether or not a third value is outputted from the contact intensity sensor 22. When a negative determination is made (S186: NO), it is determined as being a case where a so-called peak operation has been inputted, and the CPU 11 proceeds to S190. The peak operation is an operation to press the indicator, which is in contact with the touch panel 20, by an intermediate force level.

In S190, the CPU 11 determines whether or not a movement in the instruction position is detected. Specifically, an affirmative determination is made in S190 when an operation to move the indicator while maintaining its contact with the selected object image O1 is inputted. This determination can be executed by detecting whether or not the instructed coordinate outputted from the coordinate detector 19 has changed. When a negative determination is made (S190: NO), the CPU 11 returns to S186, and when an affirmative determination is made (S190: YES), the CPU 11 proceeds to S195.

In S195, the CPU 11 calculates a predetermined direction and a moving distance. The predetermined direction is a direction towards which a second instruction position P2, which is a current contact position of the indicator, is oriented with the first instruction position P1, being the contact position of the indicator as determined in S186, as a reference. The moving distance is a distance from the first instruction position P1 to the second instruction position P2.

In the explanatory example of the present embodiment, as shown in FIG. 9, a case is described in which the instruction position moves from the first instruction position P1 to the second instruction position P2. In this case, a predetermined direction SD1 and a moving distance K1 are hereby calculated.

In S200, the CPU 11 determines which one of moving directions D1 to D4 corresponds to the predetermined direction. Then, a selected image process, which is an image process associated with the moving direction corresponding to the predetermined direction, is read from the settings table TB2. In the explanatory example of the present embodiment, a case will be described in which the type of the selected object image O1 is "photo". The predetermined direction SD1 shown in FIG. 9 substantially matches the moving direction D1. Thus, the predetermined direction SD1 can be determined as corresponding to the moving direction D1. In this case, "color print" associated with the moving direction D1 is read as the selected image process as shown in the region R1 of FIG. 8.

In S210, the CPU 11 determined whether or not the selected image process read in S200 is an image process to which the process of S60 or S80 has been performed. In other words, a determination is made on whether or not the image process, which had automatically been changed in S60 or S80, is selected as the selected image process. When a negative determination is made (S210: NO), the CPU 11 proceeds to S230, and when an affirmative determination is made (S210: YES), the CPU 11 proceeds to S220.

In S220, the CPU 11 executes a notification process. The notification process is a process for notifying the user that the image process that was automatically changed has been selected as the selected image process. As an example of the notification process, the information processing device 10 may be vibrated for a certain period of time. Alternatively, a warning message such as "change has been made to XX process" may be displayed for a certain period of time on the touch panel 20.

Figure 10:
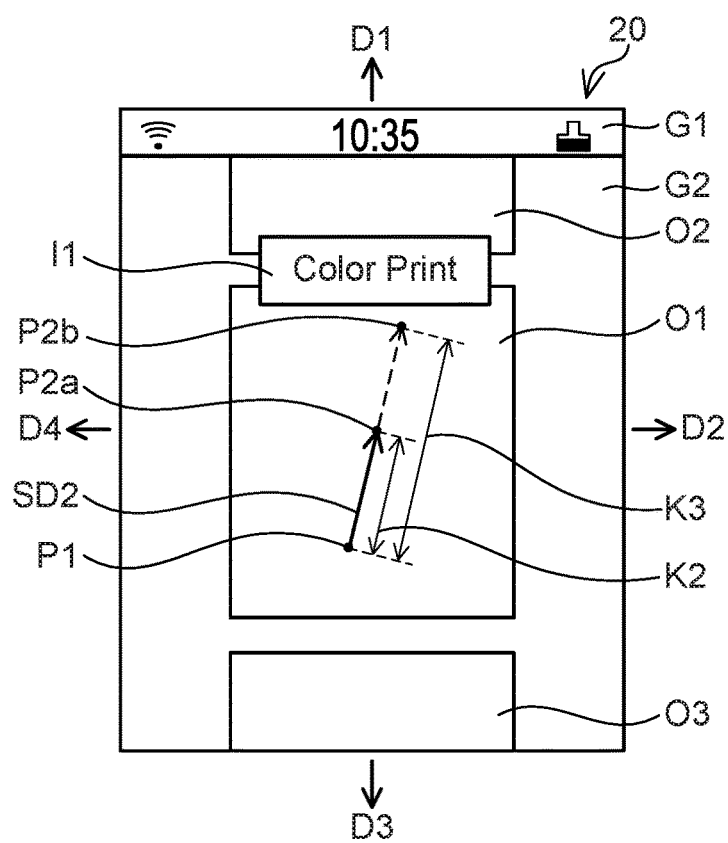
FIG. 10 is a diagram showing an example of a display screen.

In S230, the CPU 11 determines whether or not the moving distance to the second instruction position P2, being the current contact position of the indicator, has become greater than a preset first distance. The first distance may for example be 5 mm. When a negative determination is made (S230: NO), the CPU 11 proceeds to S237, and when an affirmative determination is made (S230: YES), the CPU 11 proceeds to S233. In S233, the CPU 11 displays an image indicating a content of the selected image process on the touch panel 20. In the explanatory example of the present embodiment, as shown in FIG. 10, a case will be described in which a short-distance swipe operation from the first instruction position P1 to a second instruction position P2a with a moving distance K2 has been inputted. Further, a case will be described in which a predetermined direction SD2 corresponds to the moving direction D1, and the selected image process is "color print". In this case, the moving distance K2 is determined as being greater than the first distance (S230: YES). Due to this, as shown in FIG. 10, an image I1 indicating that the content of the selected image process is "color print" is displayed on the touch panel 20. Notably, processes of S230 and S233 may be omitted. In such a case, the "image indicating the content of the image process" such as the aforementioned image I1 will not be displayed on the touch panel 20.

In S235, the CPU 11 determines whether or not the moving distance to the second instruction position P2, being the current contact position of the indicator, has become greater than a preset second distance. The second distance is a distance greater than the first distance. The second distance may for example be 10 mm. When a negative determination is made (S235: NO), the CPU 11 proceeds to S237. In S237, the CPU 11 determines whether or not the instruction position is no longer detected. When a negative determination is made (S237: NO), the CPU 11 returns to S230. On the other hand, when an affirmative determination is made (S237: YES), the CPU 11 returns to S40.

On the other hand, in S235, the CPU 11 proceeds to S250 when an affirmative determination is made (S235: YES). In S250, the CPU 11 determines whether or not the instruction position is no longer detected. When a negative determination is made (S250: NO), the CPU 11 returns to S250. On the other hand, when an affirmative determination is made (S250: YES), the CPU 11 proceeds to S255 by determining that it is a case where a so-called long-distance swipe operation has been inputted.

In S255, the CPU 11 determines whether or not the selected image process is a first type of image process. The first type of image process is an image process that can be executed s a background process. This determination can be executed by referring to a column of "second image processing type category 72" corresponding to the selected image process in the image processing table TB1 shown in FIG. 6. When an affirmative determination is made (S255: YES), the CPU 11 proceeds to S260.

In S260, the CPU 11 starts the selected image process on the image data representing the selected object image O1. In S263, the CPU 11 displays object images on the touch panels 20 similar to the process of S30 under a state in which the selected image process is executed as the background process. Due to this, selection of a subsequent new image process is enabled. That is, a standby state for an input of another operation of selecting a new image process is hereby assumed.

In the explanatory example of the embodiment, as shown in FIG. 10, a case will be described in which a long-distance swipe operation from the first instruction position P1 to a second instruction position P2b with a moving distance K3 is inputted. Further, a case will be described in which the predetermined direction SD2 corresponds to the moving direction D1, and the selected image process is "color print". In this case, the moving distance K3 is determined as being greater than the second distance (S235: YES). Further, in S255, "color print" is determined as being the first type of image process (see region R11 in FIG. 6). Thus, the CPU 11 causes the MFP 51 to execute "color print" as a background process (S260). Then, a display screen shown in FIG. 10 is displayed on the touch panel 20, and the standby state for an input of another operation is assumed (S263).

On the other hand, in S255, when a negative determination is made (S255: NO), the CPU 11 proceeds to S265. In S265, the CPU 11 starts execution of the selected image process. The selected image process executed in S265 is a second type of image process that cannot be executed as a background process. Thus, the CPU 11 displays a process screen related to the execution of the selected image process on the touch panel 20 during an executing period of the selected image process. For example, when the selected image process is "edit image", an image editing screen is displayed in the touch panel 20. Then, various image editing inputs such as trimming and rotation are accepted on the image editing screen.

In S270, the CPU 11 determines whether or not the image process of which execution was started in S265 is completed. When a negative determination is made (S270: NO), the CPU 11 returns to S270, and when an affirmative determination is made (S270: YES), the CPU 11 proceeds to S275.

In S275, the CPU 11 automatically updates the contents of the settings table TB2. Then, it returns to S40. This automatic updating process may be in various manners. For example, in the automatic updating process, the selected image process executed in S260 or S265 may be associated to a preset specific moving direction. In the explanatory example of the present embodiment, a case will be described in which the selected image process "color print" is executed on the selected object image O1 of "photo" type. Further, a case will be described in which the moving direction D2 is set as the specific moving direction. In this case, in the automatic updating process, "send FAX" is changed to "color print" in the region R2 of FIG. 8. Notably at this occasion, the image process associated to the moving direction D2, such as "PDF" or "data for word processing software", may be changed. That is, "monochrome print" in a region R7 of FIG. 8 may be changed to "color print". Due to this, when the user wishes to execute the image process that the user had most recently performed, the user simply needs to input the peak operation for the selected object image O1 (S140: YES and S186: NO), and then input the swipe operation in the moving direction D2 (S190). Operation input convenience can be improved.

Further, in S186, when an affirmative determination is made (S186: YES), it is determined that a so-called pop operation has been inputted, and the CPU 11 proceeds to S280. The pop operation is an operation to press the indicator by a stronger level of force than the aforementioned peak operation.

Figure 11:
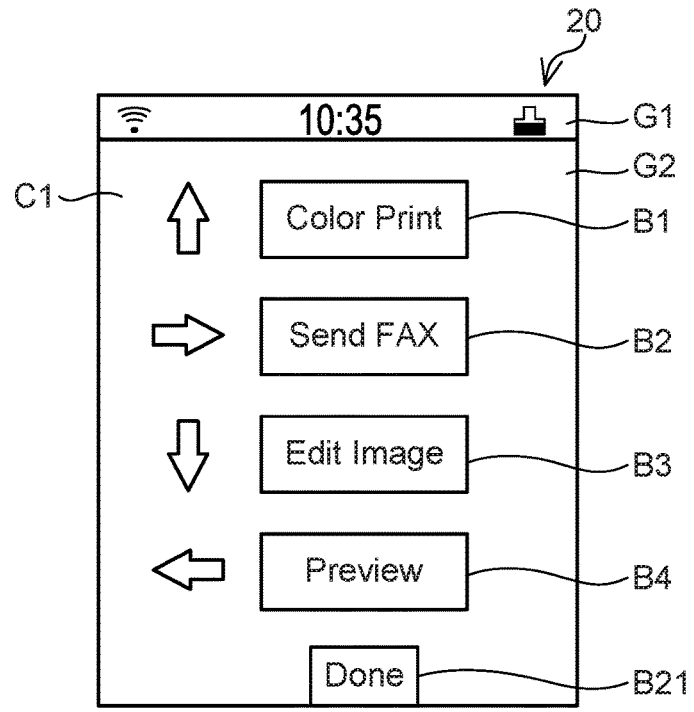
FIG. 11 is a diagram showing an example of a display screen.

In S280, the CPU 11 displays a settings table editing screen on the touch panel 20. The settings table editing screen is a screen configured to accept inputs of an operation to change contents of image processes stored in the settings table TB2 (FIG. 8), and an operation to additionally store a new image process to the settings table TB2. FIG. 11 shows an example of a settings table editing screen C1. The settings table editing screen C1 is a screen for the case where the type of the selected object image O1 is "photo". Button images B1 to B4 and B21 are displayed in the settings table editing screen C1. The button images B1 to B4 are images indicating the contents of the image processes associated with the moving directions D1 to D4 respectively. That is, contents of a region R5 in the settings table TB2 of FIG. 8 are displayed in the button images B1 to B4. Further, the button images B1 to B4 are also images for accepting operations to change the image processes associated respectively to the moving directions D1 to D4. The finish button B21 is an image configured to accept an instruction to finish editing the settings table TB2.

In S282, the CPU 11 determines whether or not any of the moving directions D1 to D4 is selected. This determination can be executed by detecting whether or not any one of the button images B1 to B4 is tapped. When a negative determination is made (S282: NO), the CPU 11 proceeds to S283. In S283, the CPU 11 determines whether or not the instruction to finish editing the settings table TB2 is inputted. This determination can be executed by detecting whether or not the finish button B21 included in the settings table editing screen C1 of FIG. 11 is tapped. When a negative determination is made (S283: NO), the CPU 11 returns to S282, and when an affirmative determination is made (S283: YES), the CPU 11 returns to S40. On the other hand, in S282, when an affirmative determination is made (S282: YES), the CPU 11 proceeds to S284

Figure 12:
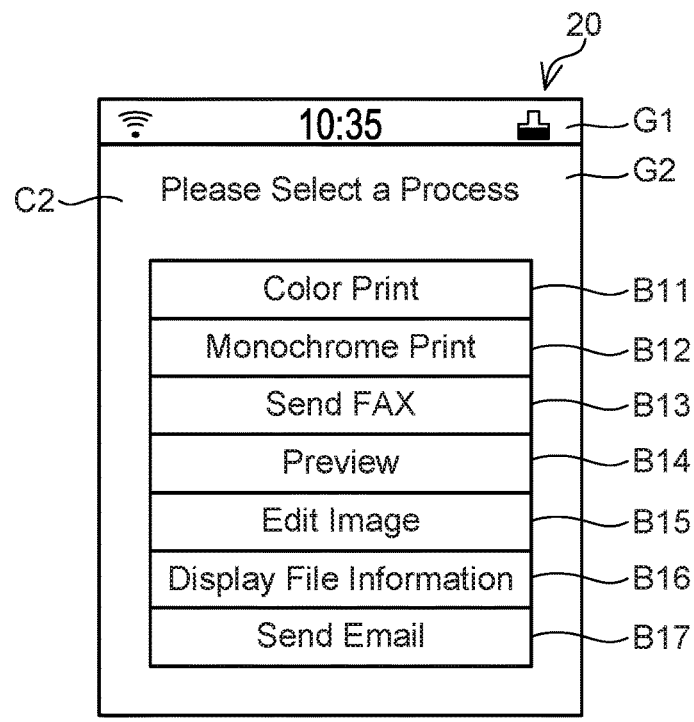
FIG. 12 is a diagram showing an example of a display screen.

In S284, the CPU 11 displays a listing screen C2 of the image processes on the touch panel 20. The listing screen C2 is a screen indicating a list of image processes that can be associated to the moving direction selected in S282. An example of the listing screen C2 is shown in FIG. 12. Button images B11 to B17 are displayed in the listing screen C2. The button images B11 to B17 are images indicating the contents of the image processes and configured to accept a selection among the image processes. The listing screen C2 of FIG. 12 can be generated based on the image processing table TB1 of FIG. 6.

In S290, the CPU 11 determines whether or not any of the plurality of image processes displayed in the listing screen C2 is selected. This determination can be executed by detecting whether or not any of the button images B11 to B17 is tapped on. When a negative determination is made (S290: NO), the CPU 11 returns to S290, and when an affirmative determination is made (S290: YES), the CPU 11 proceeds to S300.

In S300, the CPU 11 determines whether or not the image process associated with the moving direction selected in S282 is an external device image processing. This determination can be executed by referencing the first image processing type category 71 in the image processing table TB1 (FIG. 6). When a negative determination is made (S300: NO), the CPU 11 proceeds to S320. In S320, the CPU 11 changes the image process associated with the moving direction selected in S282 to the image process selected in S290. Then, it returns to S284. The settings table editing screen C1 displayed in this step newly displays the image process that was changed in S290.

On the other hand, in S300, when an affirmative determination is made (S300: YES), the CPU 11 proceeds to S305. In S305, the CPU 11 determines whether or not the image process selected in S290 is an external device image processing. This determination can be executed by referencing the first image processing type category 71 in the image processing table TB1 (FIG. 6). When a negative determination is made (S305: NO), the CPU 11 proceeds to S320, and when an affirmative determination is made (S305: YES), the CPU 11 proceeds to S310.

In S310, the CPU 11 associates the image process selected in S290 to the moving direction selected in S282. Due to this, the moving direction selected in S282 is further associated with the image process selected in S290, in addition to the image process that was originally associated thereto. The CPU 11 then returns to S284. The settings table editing screen C1 displayed at this stage has the image process associated in S310 displayed newly therein.

In the explanatory example of the present embodiment, a case will be described in which the moving direction D1 is selected by the button image B1 of FIG. 11 being tapped on (S282). Further, a case will be described in which "send FAX" is selected by the button image B13 of FIG. 12 being tapped on (S290). Since the image process that is associated with the moving direction D1 is "color print", an affirmative determination is made in S300. Further, since "send FAX" selected in S290 is an external device image process, an affirmative determination is made in S305. Thus, "send FAX" is additionally associated with the moving direction D1, in addition to "color print", as shown in a region R21 of the settings table TB2a in FIG. 13.

Effects

A case of using a technique of displaying plural button images on the touch panel 20 to accept selections of the image processes to be executed on the selected object image O1, and accepting a tap input to a button image will be considered. Each of the plural button images has a character string or an icon indicating a content of its corresponding image process. In this case, a first time period for displaying the plural button images, a second time period for the user to confirm displayed contents of the plural button images, and a third time period for the user to input a tap operation to one of the button images become necessary. On the other hand, with the technique described herein, in order to select an image process to be executed on the selected object image O1, the indicator simply needs to be moved in a predetermined direction (S190: YES) after having brought the indicator into contact with the selected object image O1 (S110: YES). Due to this, an image process corresponding to the predetermined direction can be executed on the selected object image O1 (S260, S265). That is, in the technique herein, the images indicating respective contents of the plural image processes do not need to be displayed on the touch panel 20. Due to this, the user does not need to confirm the displayed contents of the button images, or to touch the button image by the indicator. Thus, since the aforementioned first to third time periods can be omitted, the image process selection input can be promptly accepted.

The image indicating the content of the selected image process can be displayed (S233, FIG. 10) by inputting the swipe operation with a shorter distance than the second distance (S230: YES). Due to this, the user can be given an advance notice on which image processes can be executed according to the input direction of the swipe operation.

When the selected image process is the first type of image process that can be executed as a background process (S255: YES), the standby state for an input of an operation of selecting a new image process can be assumed even during the period in which the selected image process is being executed (S263). Due to this, plural image processes can be executed in parallel.

In the settings table TB2 shown in FIG. 8, the type of image processes that can be associated to respective one of the moving directions D1 to D4 when the type of the object image data is "photo", and the type of image processes that can be associated to respective one of the moving directions D1 to D4 when the type of the object image data is "PDF" can be set differently. Due to this, image processes that are appropriate can be executed according to the types of the object image data.

The table editing screen C1 (FIG. 11) can be displayed on the touch panel 20 (S280) by inputting the pop operation into the selected object image O1 (S186: YES). That is, the user simply needs to press harder on the first instruction position P1 within the object image when the user desires to change an image process associated with any of the moving directions D1 to D4. Convenience of input operation can be improved.

Although "monochrome print" uses only black ink, "color print" also uses color ink in addition to the black ink. That is, "monochrome print" is a process that uses less ink as compared to "color print". Thus, with the technique disclosed herein, "color print" stored in the settings table TB2 can be changed to "monochrome print" (S60) when it is determined that the ink remaining amount(s) of the printer 52 are equal to or less than predetermined amount(s) (S50: YES). Due to this, frequency of an occurrence of ink shortage can be reduced by suppressing ink consumption amounts in the printer 52.

The external device image processing is a process in which the image data needs to be sent to the MFP 51 via the wireless communication 200. Thus, with the technique disclosed herein, "external device image processing" stored in the settings table TB2 can be changed to "internal image processing" (S80) when it is determined that the radio field intensity of the wireless communication 200 is equal to or less than a predetermined intensity (S70: YES). Due to this, an image processing failure can be prevented before happening, since the image data will not be sent to the MFP 51.

When the image process that was automatically changed in S60 or S80 is selected as the selected image process (S210: YES), the notification process can be executed (S220). Due to this, a selected image process that the user did not intend can be prevented from being executed.

In the external device image process, various image processes may be executed in the MFP 51. Thus, process load on the information processing device 10 is smaller when the external device image process is executed than when the internal device image process is executed. Thus, plural external device image processes can be executed in parallel. Thus, with the technique disclosed herein, a new external device image process can further be added and associated to the moving direction selected in S282 (S310), when another external device image process is already associated with the moving direction selected in S282 (S300: YES) and the image process selected in S290 is an external device image process (S305: YES). Due to this, plural image processes can be associated to one moving direction D1, as shown for example in the region R21 of the settings table TB2a of FIG. 13. Further, by inputting a single swipe operation to select the image processes in the region R21, execution of two processes in parallel, namely "color print" and "send FAX", can be instructed to the MFP 51. Convenience of input operation can be improved.

The object images can be displayed in a scroll display (S160) by inputting a swipe operation (S150: YES) after having lightly touched the selected object image O1 (S140: NO). On the other hand, the image process corresponding to the direction towards which the swipe operation had been inputted can be executed (S260, S265) by inputting the swipe operation (S190: YES and S250: YES) after having inputted the peak operation into the selected object image O1 (S140: YES and S186: NO). That is, when the user desires to execute an image process, the user simply needs to press harder on the first instruction position P1 within the object image and then perform the swipe operation. Convenience of input operation can be improved.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

In S233, manners by which the contents of the image processes are to be displayed may vary. For example, an image indicating the contents of the four image processes associated respectively to the moving directions D1 to D4 may be displayed on the touch panel 20 when a shot-distance swipe operation is inputted.

The contents of the automatic updating process of the settings table TB2 executed in S275 may vary. For example, a number of times of having been selected as the selected image process in the past may be stored for each of the plural image processes indicated in the image processing table TB1 (FIG. 6). Further, the image process with the greatest number of selection in the past may be associated with a predetermined moving direction that is predeterminedly set.

The notification process of S220 may be in various configurations. For example, a value of the second distance may be increased when the selection of the automatically changed image process as the selected image process is detected in S200. Due to this, a swipe operation over a longer distance than usual becomes required in S235 to execute the image process. That is, the user may be given a caution by intentionally configuring it more difficult to input the execution instruction of the image process.

The process of automatically changing the image process may be omitted. In this case, S50 to S80 may be omitted, and the CPU 11 may proceed from S40 to S110. Further, the processes of S150 to S184 may be omitted. The notification process may be omitted. In this case, S210 and S220 may be omitted, and the CPU 11 may proceed from S200 to S230. As above, in more general terms, the information processing device 10 simply needs to execute processes of: storing first and second image processes in respective association with first and second moving directions, displaying an object image, detecting a first instruction position, detecting a second instruction position, calculating a predetermined direction, and executing the first or second image process at the minimum. As specific examples thereof, the information processing device 10 simply needs to execute S310 or S320, S30, S110, S190, S195, and S260 or S265 at the minimum.

Figure 14:
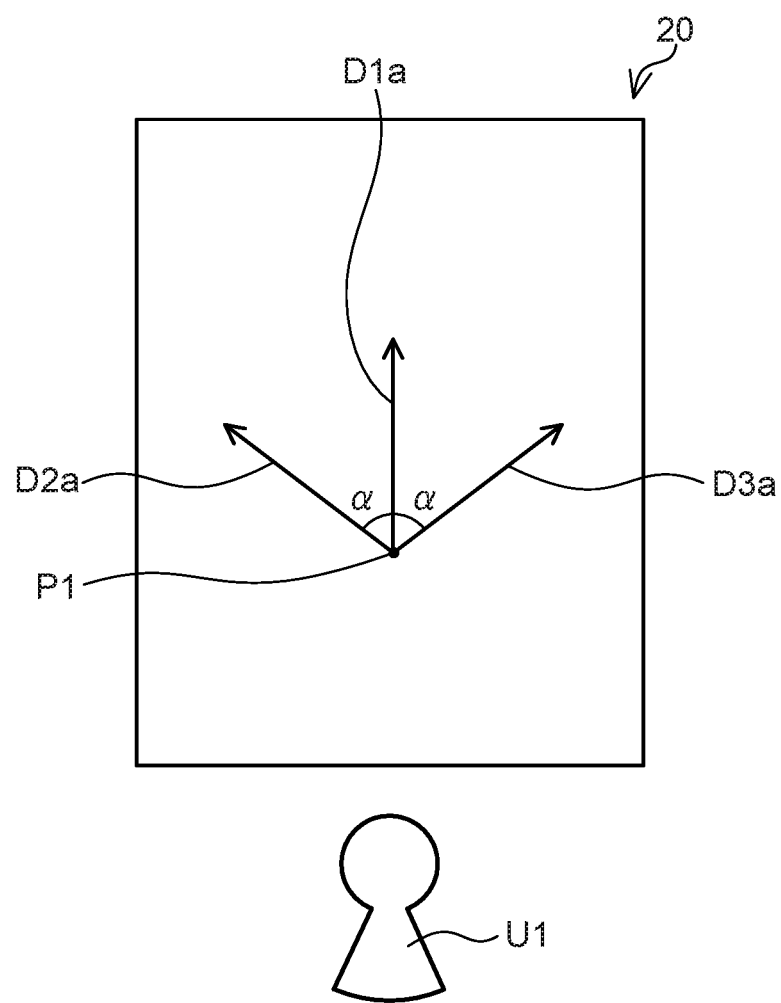
FIG. 14 is a diagram showing an example of a moving direction.

The moving directions D1 to D4 are mere examples. The directions are not limited to directions along X or Y axis. For example, as shown in FIG. 14, moving directions D2a and D3a, each having a predetermined angle α (e.g., 45 degrees) relative to the moving direction D1a may be used.

A case has been described in which the touch panel 20 detects the contact by the indicator, however, no limitation is made hereto. The touch panel 20 may detect an approach of the indicator.

The MFP 51 is exemplified as an example of the external device, however, no limitation is made hereto. Various devices, such as a scanner or a PC, may be used as the external device.

The contents of the image processing table TB1 in FIG. 6 and the settings table TB2 in FIG. 8 are mere examples. Further, the displayed configurations of the display screen shown in FIGS. 7, 9 to 12, and 14 are mere examples, and other display configurations may be used.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The panel 18 is an example of a display. The coordinate detector 19 is an example of a position detector. The CPU 11 is an example of a controller. The image processing application 32 is an example of computer-readable instructions. The CPU 11 executing S310, S320 is an example storing first and second image processes in respective association with first and second moving directions. The CPU 11 executing S30 is an example displaying an object image. The CPU 11 executing S110 is an example detecting a first instruction position. The CPU 11 executing S190 is an example detecting a second instruction position. The CPU 11 executing S195 is an example calculating a predetermined direction. The CPU 11 executing S260, S265 is an example executing the first and second image processes. The CPU 11 executing S233 is an example displaying an image indicating a process content of the first and the second image process. The CPU 11 executing S284 is an example displaying an image indicating a process content of each of plural types of image processes. The CPU 11 executing S290 is an example accepting an operation to select the first or second image process. The pop operation is an example of a predetermined operation. The MFP 51 is an example of an external device. The printer 52 is an example of a printer. The CPU 11 executing S40 is an example of receiving device information. The color print is an example of a first printing process. The monochrome print is an example of a second printing process. The CPU 11 executing S220 is an example notifying a user of a change. The CPU 11 executing S70 is an example determining a radio field intensity. The external device image processing is an example of an image data sending process. The internal image processing is an example of a specific process. The Y-axis direction is an example of a first direction. The X-axis direction is an example of a second direction.

What is claimed is:

1. A non-transitory computer-readable recording medium storing computer-readable instructions for an information processing device that comprises a display; a position detector; and a memory, the computer-readable instructions, when executed by a controller of the information processing device, causing the information processing device to perform:

storing a first image process, which is selected from among plural types of image processes, in the memory by associating the first image process with a first moving direction, wherein the first moving direction is a direction having a display frame of the display as a reference;

storing a second image process, which is selected from among plural types of image processes, in the memory by associating the second image process with a second moving direction, which is different from the first moving direction, wherein the second moving direction is a direction having the display frame of the display as the reference;

displaying an object image on the display;

detecting:
    a first instruction position by using the position detector in a case where an indicator makes contact with a displayed region of the object image, the first instruction position indicating a position where the indicator has made contact and;
    a contact intensity of the indicator using the position detector; and detecting a second instruction position by using the position detector, in a case where the indicator moves to the second instruction position, after the first instruction position had been detected, while maintaining a state of being in contact with or being in proximity of a surface of the display;

wherein on condition that the second instruction position is detected in the detecting of the second instruction position after the detected contact intensity has not exceeded a first threshold, the computer-readable instructions further cause the information processing device to perform:
    scrolling the object image according to a predetermined direction that towards which the second instruction position is located with the first instruction position as a reference, wherein on condition that the second instruction position is detected in the detecting of the second instruction position after the detected contact intensity has exceeded the first threshold, the computer-readable instructions further cause the information processing device to perform:
    calculating the predetermined direction and a moving distance, the moving distance being a distance from the first instruction position to the second instruction position,
    wherein in a case where the calculated predetermined direction corresponds to the first moving direction, a first specific image that indicates a process content of the first image process and that has not been displayed is newly displayed on the display on condition that the calculated moving distance exceeds a predetermined first distance, and the first image process, which is associated with the displayed first specific image, is executed on image data representing the object image on condition that the calculated moving distance exceeds a predetermined second distance which is greater than the predetermined first distance after the first specific image has been displayed, regardless of whether the second instruction position is within an area where the first specific image is displayed, wherein in a case where the calculated predetermined direction corresponds to the second moving direction, a second specific image that indicates a process content of the second image process and that has not been displayed is newly displayed on the display on condition that the calculated moving distance exceeds a predetermined first distance, and the second image process, which is associated with the displayed second specific image, is executed on the image data representing the object image on condition that the calculated moving distance exceeds the predetermined second distance after the second specific image has been displayed, regardless of whether the second instruction position is within an area where the second specific image is displayed.

2. The non-transitory computer-readable recording medium according to claim 1, wherein a first type and a second type exist for the first image process and the second image process, the first type of the first image process and the first type the second image process are image processes that do not need have their process contents displayed on the display, the second type of the first image process and the second type the second image process are image processes that need have their process contents displayed on the display, and the computer-readable instructions cause the information processing device to further perform the displaying of the object image, the detecting of the first instruction position, the detecting of the second instruction position, the calculating of the predetermined direction, and at least one of the executing the first image process and the executing of the second image process, during a period in which one of the first type of the first image process and the first type the second image process is being performed.

3. The non-transitory computer-readable recording medium according to claim 1, wherein plural types exist for the object image, and the storing of the first image process and the storing of the second image process are performed for each of the plural types of the object image.

4. The non-transitory computer-readable recording medium according to claim 1, wherein the computer-readable instructions, when executed by the controller of the information processing device, further cause the information processing device to perform:

displaying an image indicating a process content of each of the plural types of image processes on the display when an input of a predetermined operation is detected by the position detector; and accepting an input of an operation to select the first image process or the second image process from among the plural types of image processes, and the first image process or the second image process selected by the accepting is stored in the memory in corresponding one of the storing of the first image process and the storing of the second image process.

5. The non-transitory computer-readable recording medium according to claim 4, wherein in the displaying of the image indicating the process content of each of the plural types of image processes, the predetermined operation is determined as having been inputted when the contact intensity is detected in the detecting of the contact intensity as having exceeded a second threshold.

6. The non-transitory computer-readable recording medium according to claim 1, wherein the information processing device further comprises a communication interface configured to communicate with an external device, the computer-readable instructions, when executed by the controller of the information processing device, further cause the information processing device to perform:

receiving device information from the external device, the device information indicating a remaining amount of a consumption component used in a printer provided in the external device; and when the remaining amount of the consumption component indicated in the received device information is equal to or less than a predetermined amount and the first image process is a first printing process to cause the external device to execute printing, changing a content of the first image process from the first printing process to a second printing process by performing the storing of the first image process, and the second printing process is a process with a less consuming amount of the consumption component than the first printing process.

7. The non-transitory computer-readable recording medium according to claim 6, wherein the computer-readable instructions, when executed by the controller of the information processing device, further cause the information processing device to perform notifying a user of a change that has been made to the content of the first image process, when the first moving direction is calculated in the calculating of a predetermined direction under a state in which the content of the first image process has been changed from the first printing process to the second printing process.

8. The non-transitory computer-readable recording medium according to claim 1, wherein the information processing device further comprises a communication interface configured to perform a wireless communication with an external device, the computer-readable instructions, when executed by the controller of the information processing device, further cause the information processing device to perform:

determining a radio field intensity of the wireless communication; and when the radio field intensity determined in the determining is equal to or less than a predetermined intensity and the first image process is an image data sending process of sending image data via the wireless communication to the external device, changing a content of the first image process from the image data sending process to a specific process by performing the storing of the first image process, and the specific process is a process that does not use the wireless communication.

9. The non-transitory computer-readable recording medium according to claim 8, wherein the computer-readable instructions, when executed by the controller of the information processing device, further cause the information processing device to perform notifying a user that the content of the first image process has been changed, when the first moving direction is calculated in the calculating of the predetermined direction under a state in which the content of the first image process has been changed from the image data sending process to the specific process.

10. The non-transitory computer-readable recording medium according to claim 1, wherein the information processing device further comprises a communication interface configured to perform a wireless communication with an external device, the plural types of image processes include plural types of external device image processes, the external device processes are processes for causing the external device to perform various processes by sending image data to the external device via the communication interface, the storing of a first image process is capable of storing two or more types of the external device image processes in the memory as the first image processes, and the storing of a second image process is capable of storing two or more types of the external device image processes in the memory as second image processes.

11. The non-transitory computer-readable recording medium according to claim 1, wherein the display comprises a first side extending in a first direction, and a second side extending in a second direction that is orthogonal to the first direction, the first moving direction is a direction corresponding to the first direction, and the second moving direction is a direction corresponding to the second direction.

12. An information processing device comprising:
a display;
a position detector;
a controller; and
a memory storing computer-readable instructions;
wherein the computer-readable instructions, when executed by the controller, cause the information processing device to perform:
storing a first image process, which is selected from among plural types of image processes, in the memory by associating the first image process with a first moving direction, wherein the first moving direction is a direction having a display frame of the display as a reference;
storing a second image process, which is selected from among plural types of image processes, in the memory by associating the second image process with a second moving direction, which is different from the first moving direction, wherein the second moving direction is a direction having the display frame of the display as the reference;
displaying an object image on the display;
detecting:
a first instruction position by using the position detector in a case where an indicator makes contact with a displayed region of the object image, the first instruction position indicating a position where the indicator has made contact and;
a contact intensity of the indicator using the position detector; and detecting a second instruction position by using the position detector, in a case where the indicator moves to the second instruction position, after the first instruction position had been detected, while maintaining a state of being in contact with or being in proximity of a surface of the display;

wherein on condition that the second instruction position is detected in the detecting of the second instruction position after the detected contact intensity has not exceeded a first threshold, the computer-readable instructions further cause the information processing device to perform:

scrolling the object image according to a predetermined direction that towards which the second instruction position is located with the first instruction position as a reference, wherein on condition that the second instruction position is detected in the detecting of the second instruction position after the detected contact intensity has exceeded the first threshold, the computer-readable instructions further cause the information processing device to perform:

calculating the predetermined direction and a moving distance, the moving distance being a distance from the first instruction position to the second instruction position, wherein in a case where the calculated predetermined direction corresponds to the first moving direction, a first specific image that indicates a process content of the first image process and that has not been displayed is newly displayed on the display on condition that the calculated moving distance exceeds a predetermined first distance, and the first image process, which is associated with the displayed first specific image, is executed on image data representing the object image on condition that the calculated moving distance exceeds a predetermined second distance which is greater than the predetermined first distance after the first specific image has been displayed, regardless of whether the second instruction position is within an area where the first specific image is displayed, wherein in a case where the calculated predetermined direction corresponds to the second moving direction, a second specific image that indicates a process content of the second image process and that has not been displayed is newly displayed on the display on condition that the calculated moving distance exceeds a predetermined first distance, and the second image process, which is associated with the displayed second specific image, is executed on the image data representing the object image on condition that the calculated moving distance exceeds the predetermined second distance after the second specific image has been displayed, regardless of whether the second instruction position is within an area where the second specific image is displayed.

* * * * *

UNITED STATES PATENT AND TRADEMARK OFFICE
CERTIFICATE OF CORRECTION

PATENT NO. : 10,771,650 B2  
APPLICATION NO. : 15/581316  
DATED : September 8, 2020  
INVENTOR(S) : Shintaro Kunimoto Page 1 of 1

It is certified that error appears in the above-identified patent and that said Letters Patent is hereby corrected as shown below:

On the Title Page

(57) Abstract, Line 1 should read:
An information processing device may store a first and second In the Claims Column 16, Claim 1, Line 37 should read:
indicator has made contact; and Column 16, Claim 1, Line 53 should read:
direction towards which the second instruction Column 17, Claim 2, Line 38 should read:
of the second image process are image processes that do Column 17, Claim 2, Line 42 should read:
type of the second image process are image processes that Column 17, Claim 2, Line 53 should read:
process and the first type of the second image process is Column 20, Claim 12, Line 3 should read:
indicator has made contact; and Column 20, Claim 12, Line 19 should read:
direction towards which the second instruction Signed and Sealed this  
Fifth Day of January, 2021

Andrei Iancu  
*Director of the United States Patent and Trademark Office*